United States Patent
Lin

(10) Patent No.: US 8,577,080 B2
(45) Date of Patent: Nov. 5, 2013

(54) OBJECT CONTOUR DETECTION DEVICE AND METHOD

(75) Inventor: Chih-Hsiung Lin, New Taipei (TW)

(73) Assignee: Era Optoelectronics Inc., New Taipei (TW)

(*) Notice: Subject to any disclaimer, the term of this patent is extended or adjusted under 35 U.S.C. 154(b) by 243 days.

(21) Appl. No.: 13/244,413

(22) Filed: Sep. 24, 2011

(65) Prior Publication Data

US 2013/0011044 A1    Jan. 10, 2013

(30) Foreign Application Priority Data

Jul. 7, 2011    (TW) .............................. 100124024 A

(51) Int. Cl.
*G06K 9/00* (2006.01)
(52) U.S. Cl.
USPC ........................................................ 382/100
(58) Field of Classification Search
None
See application file for complete search history.

(56) References Cited

U.S. PATENT DOCUMENTS

| | | | |
|---|---|---|---|
| 2005/0047640 A1* | 3/2005 | Eisfeld et al. | 382/133 |
| 2008/0175508 A1* | 7/2008 | Bando et al. | 382/255 |
| 2011/0142356 A1* | 6/2011 | Uemori et al. | 382/233 |
| 2011/0305403 A1* | 12/2011 | Hirano | 382/266 |

\* cited by examiner

*Primary Examiner* — Claire X Wang
*Assistant Examiner* — Thomas A James

(57) ABSTRACT

An object contour detection method includes: allowing an image sensor to sense respectively a plurality of images of an object by moving a lens with a shallow depth of field at a plurality of positions repeatedly, meanwhile, record the plurality of positions of the lens and the plurality of images one-to-one corresponding to the plurality of positions; removing respectively unclear areas in the plurality of images to obtain a plurality of clear images, and obtaining a plurality of displacement quantities of depth of field depending on a displacement quantity between each two adjacent positions in the plurality of positions; and extending a depth of the front image to reach the corresponding displacement quantity of depth of field and then combine the front image with the rear image in sequence, allowing the plurality of clear images to combine into a stereoscopic image corresponding to the object contour.

7 Claims, 4 Drawing Sheets

OBJECT CONTOUR DETECTION DEVICE AND METHOD

BACKGROUND OF THE INVENTION

1. Field of the Invention

The present invention relates to an object contour detection device and method, and more particularly to a device and method for obtaining an object contour information by capturing an object image through a camera.

2. Description of Related Art

A general camera can only be used to capture a planar image of an object, and the planar image cannot be used to obtain three dimensional contour information of the object.

Taiwan Patent No. M373507 discloses a stereoscopic vision panoramic matching device, comprising a gaze stereoscopic photography system, a signal processor electrically connected to the gaze stereoscopic photography system and receiving primary images from the gaze photography system. The stereoscopic vision panoramic matching device includes two cameras, where two optical axes of the two cameras are intersected with each other at the same point.

Taiwan Patent No. M364920 discloses an infrared light source three-dimensional human's face identification device, including a stereoscopic camera configured with a left camera used for capturing a left image and a right camera used for capturing a right image, an infrared light source providing illumination for the stereoscopic camera, and an image processor electrically connected to the stereoscopic camera and matching the left image with the right image to form a three-dimensional image.

The both technologies of the Taiwan patents mentioned above need utilize two cameras and can then obtain the stereoscopic image information of an object.

SUMMARY OF THE INVENTION

To improve a conventional technology of obtaining a stereoscopic contour information of an object, the present invention is proposed.

The main object of the present invention is to provide an object contour detection device and method, utilizing only one single lens and the stereoscopic contour information of an object can then be obtained, thereby improving a conventional technology of only utilizing two cameras to obtain the stereoscopic image information of an object.

Another object of the present invention is to provide an object contour detection device and method, allowing an image sensing unit to sense respectively a plurality of images of an object by moving a lens repeatedly at a plurality of positions. Meanwhile, record the plurality of positions of the lens and a plurality of images corresponding one-to-one to the plurality of positions; removing respectively unclear areas in the plurality of images to obtain a plurality of clear images and obtaining a plurality of displacement quantities of depth of field depending on a displacement quantity between the two adjacent positions in the plurality of position information, allowing two adjacent front image and rear image information in the plurality of clear image to correspond to a displacement quantity of depth of field; next, extending the depth of the front image to reach corresponding displacement quantity of depth of field in sequence and then combining the front image with the rear image, allowing the plurality of clear image information to be combined into a stereoscopic image corresponding to the object contour.

BRIEF DESCRIPTION OF THE DRAWINGS

The present invention can be more fully understood by reference to the following description and accompanying drawings, in which.

DETAILED DESCRIPTION OF THE PREFERRED EMBODIMENTS

Figure 1:
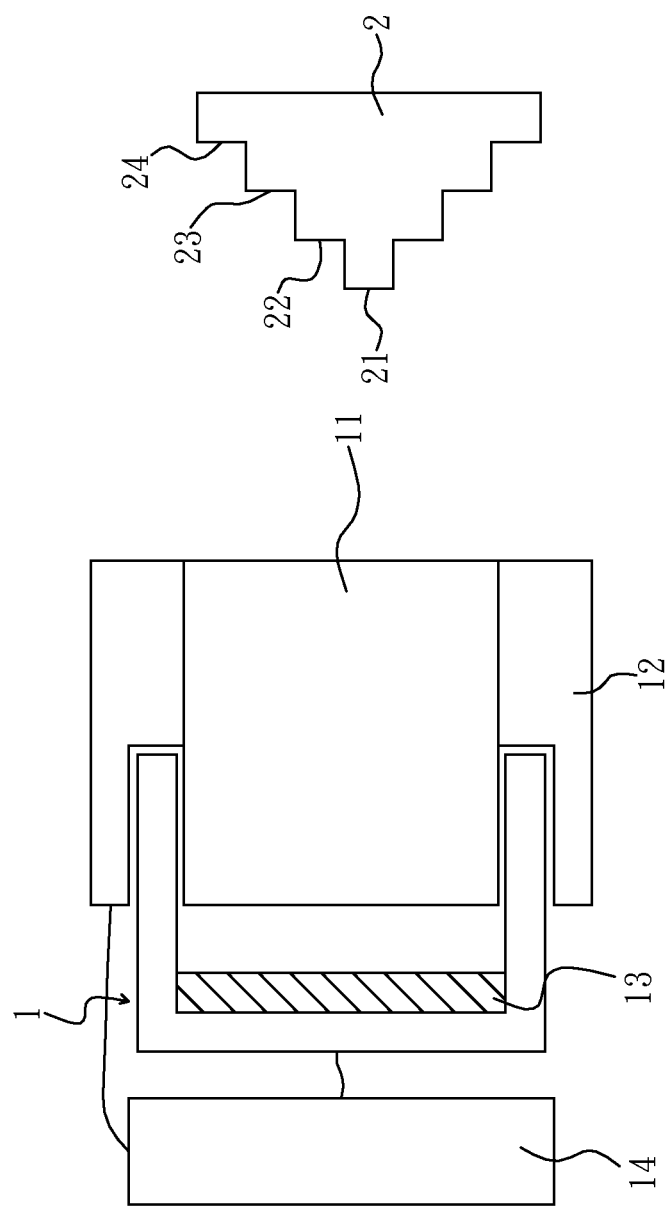
FIG. 1 is a schematic view of an object contour detect device of the present invention.

Referring to FIG. 1, an object contour detection device 1 includes a lens 11 with a shallow depth of field, a repeated movement mechanism 12, an image sensor 13 and a microprocessor 14. The image sensor 13 may be an image sensing element in a general digital video camera or digital camera; the repeated movement mechanism may be a voice coil motor.

The repeated movement mechanism 12 is coupled to the lens 11 to drive the lens 11 to move around repeatedly. The image sensor 13 corresponds to the lens 11, sensing a plurality of images of an object 2 through the lens 11. The microprocessor 14 is electrically connected to the repeated movement mechanism 12 and the image sensor 13, and capable of detecting and recording the positions at which the repeated movement mechanism 12 drives the lens 11 to move around repeatedly, detecting and recording a plurality of images sensed by the image sensor 13 corresponding to the positions of the lens 11, and carrying out an analysis process to the plurality of images to obtain a contour of the object 2.

Referring to FIG. 1, supposed that the object 2 has a middle portion 21, first portion 22, second portion 23 and peripheral portion 24 connected to each other in sequence and disposed stepwise in sequence; the second portion 23 is projected out of the peripheral portion, the first portion 22 is projected out of the second portion 23, and the middle portion 21 is projected out of the first portion 22.

Figure 2:
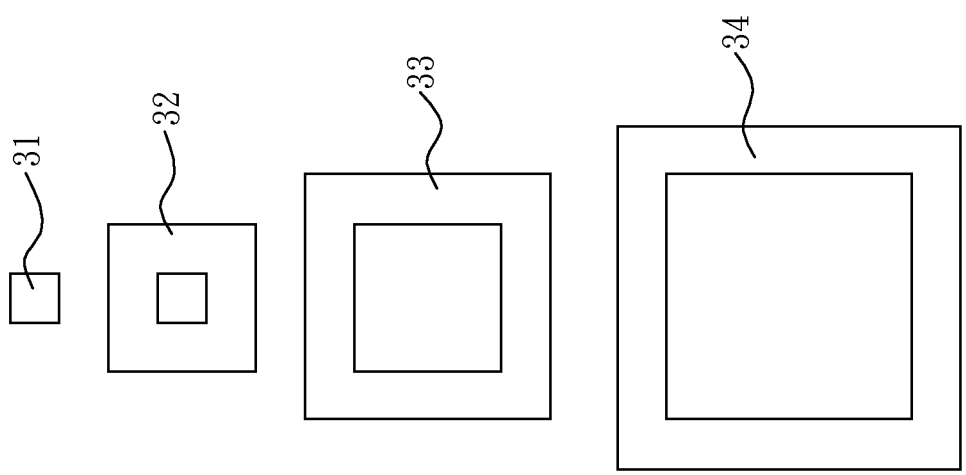
FIG. 2 is a schematic view of an object contour detection device obtaining a plurality of clear images of the present invention.

When the repeated movement mechanism 12 drives the lens 11 to move around repeatedly, the image sensor 13 can sense a plurality of images continuously through the lens 11. The images corresponding to the middle portion 21, first portion 22, second portion 23 and peripheral portion 24 of the object 2 can respectively be obtained after the plurality of images are processed by the microprocessor 14, and unclear areas in the images are further removed to obtain a clear first image 31, second image 32, third image 33 and fourth image 34, as FIG. 2 shows, meanwhile, the positions at which the lens 11 can be known through the detection and recording of the microprocessor 14 when the lens 11 captures the first image 31, second image 32, third image 33 and fourth image 34; they respectively are positions X1, X2, X3 and X4. Thereafter, the microprocessor 14 is used to calculate displacement quantities between all the two adjacent positions; they respectively are $\Delta 1$, $\Delta 2$ and $\Delta 3$, where $\Delta 1 = X1 - X2$, $\Delta 2 = X2 - X3$ and $\Delta 3 = X3 - X4$. Moreover, displacement quantities of depth of field $\Delta 1'$, $\Delta 2'$ and $\Delta 3'$ between the first image 31 and second image 32, the second image 32 and third image 33 and the third image 33 and fourth image 34 can respectively be obtained by comparing respectively the substantial distances between the middle portion 21 and first portion 22, the first portion 22 and second portion 23, and the second portion 23 and peripheral portion 24 with the displacement quantities Δ1, Δ2 and Δ3.

The microprocessor 14 is allowed to extend the depth of the first image 31 to the displacement quantity of depth of field Δ1', and then combine it with the second image 32; extend the depth of the second image 32 to the displacement quantity of depth of field Δ2', and then combined it with the third image 33; and extend the depth of the third image 33 to the displacement quantity of depth of field Δ3', and combine it with the fourth image 34. Finally, a stereoscopic image 3 corresponding to the object 2 can be obtained, as FIG. 3 shows.

Figure 3:
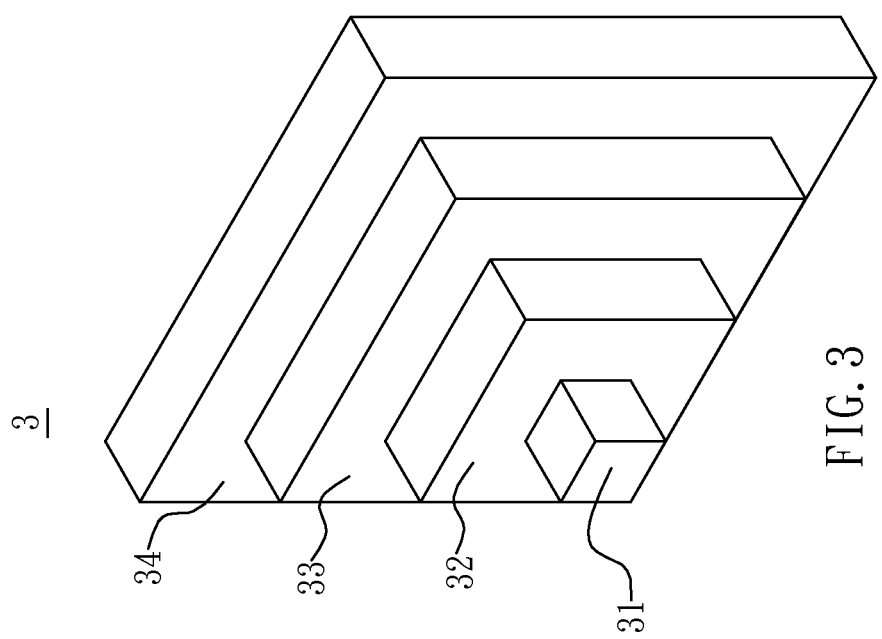
FIG. 3 is a schematic view of an object contour detection device obtaining a stereoscopic image corresponding to an object contour of the present invention.
Figure 4:
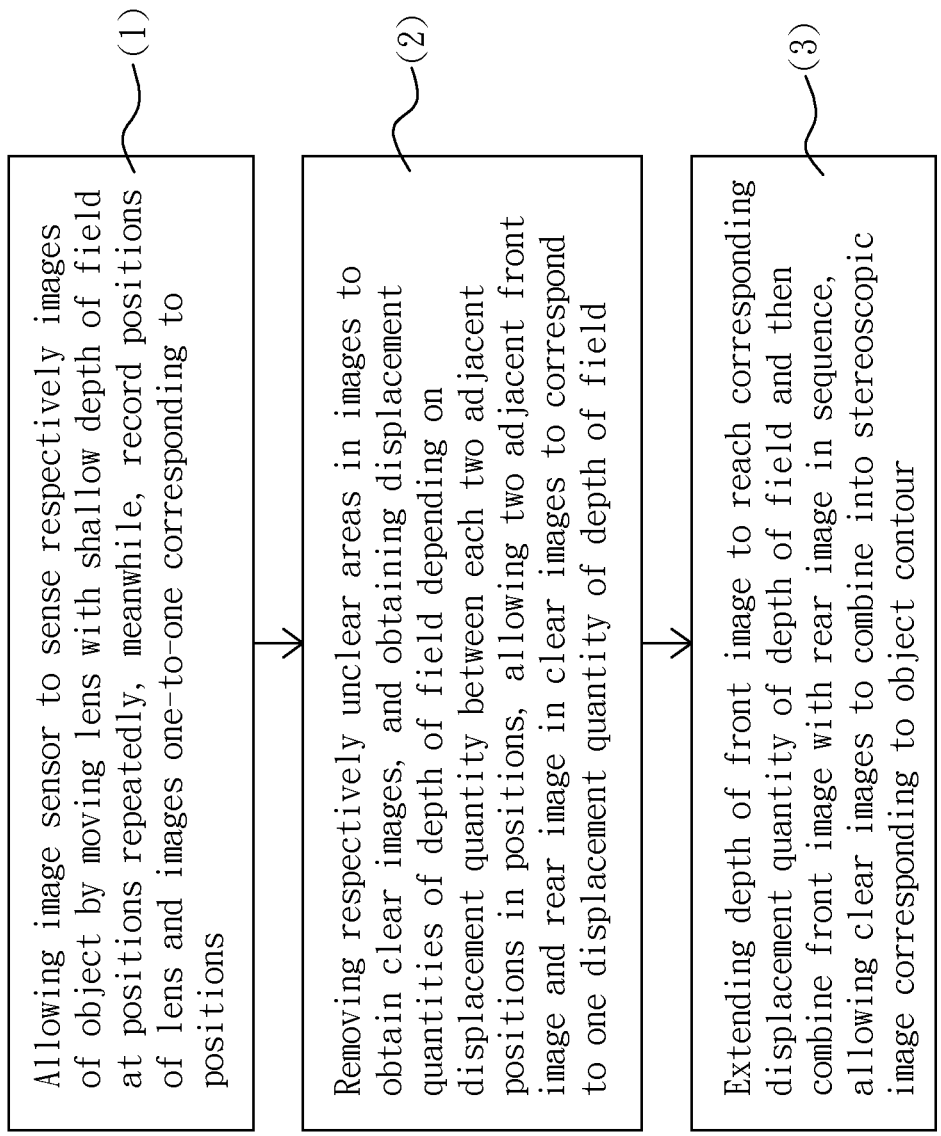
FIG. 4 is a flow chart of an object contour detection method according to the present invention.

An object contour detection method of the present invention, as FIGS. 1, 3 and 4 show, includes the following steps:

(1) allowing an image sensor 13 to sense respectively a plurality of images of an object 2, meanwhile, record a plurality of positions of a lens 11 and the plurality of images one-to-one corresponding to the plurality of positions.

(2) removing respectively unclear areas in the plurality of images to obtain the plurality of clear images, and obtaining a plurality displacement quantities of depth of field depending on a displacement quantity between each two adjacent positions in the plurality of positions, allowing each adjacent front image and rear image in the plurality of clear images to correspond to one displacement quantity of depth of field;

(3) Extending a depth of the front image to reach the corresponding displacement quantity of depth of field in sequence, and then combining the front image with the rear image, allowing the plurality of clear images to be combined into a stereoscopic image 3 corresponding to the contour of the object 2.

In the step (1) mentioned above, the microprocessor 14 may be allowed to detect and record the plurality of positions and the plurality of images of the lens 11, and a repeated movement mechanism 12 may be allowed to drive the lens 11 to move around repeatedly. In the step (1) mentioned above, the microprocessor 14 may be allowed to remove respectively the unclear areas in the plurality of images, and calculate the displacement quantity between the two adjacent positions in the plurality of positions. In the step (3) mentioned above, the microprocessor 14 may be allowed to extend the depth of the front image to reach the corresponding displacement quantity of depth of field and then combine the front image with the rear image in sequence, allowing the plurality of clear images to be combined into the stereoscopic image 3 corresponding to the contour of the object 2.

The object contour detection method of the present invention includes the relative technologies disclosed by the object contour detection device of the present invention mentioned above, the details are omitted here.

The present invention can obtain the stereoscopic contour of an object with only one lens, thereby improving the conventional technology in which the stereoscopic image of an object can be obtained only with two video cameras.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An object contour detection device, comprising:
a lens, having a shallow depth of field;
an image sensor, corresponding to said lens; and
a microprocessor, electrically connected to said image sensor;
wherein, said image sensor respectively senses a plurality of images of an object when said lens is moved at a plurality of positions repeatedly; said microprocessor detects and records said plurality of positions at which said lens is moved around repeatedly and said plurality of images having a one-to-one correspondence to said plurality of positions sensed by said image sensor; said microprocessor respectively removes unclear areas in said plurality of images to obtain a plurality of clear images, obtains a plurality of displacement quantities of depth of field depending on a displacement quantity between each two adjacent positions in said plurality of positions, allowing two adjacent front image and rear image in said plurality of clear images to correspond to a displacement quantity of depth of field: said microprocessor extends a depth of said front image to said corresponding displacement quantity of depth of field, and then combines said front image with said rear image in sequence, allowing said plurality of clear images to be combined into a stereoscopic image corresponding to said object contour.

2. The object contour detection device according to claim 1, further comprising a repeated movement mechanism; said repeated movement mechanism driving said lens to move around repeatedly; said microprocessor being electrically connected to said repeated movement mechanism, thereby detecting and recording positions at which said repeated movement mechanism drives said lens to move around.

3. The object contour detection device according to claim 1, wherein said repeated movement mechanism is a voice coil motor.

4. An object contour detection method, comprising the following steps:

(1) allowing an image sensor to sense respectively a plurality of images of an object by moving a lens with a shallow depth of field at a plurality of positions repeatedly, meanwhile, record said plurality of positions of said lens and said plurality of images having a one-to-one correspondence to said plurality of positions;

(2) removing respectively unclear areas in said plurality of images to obtain a plurality of clear images, and obtaining a plurality of displacement quantities of depth of field depending on a displacement quantity between each two adjacent positions in said plurality of positions, allowing two adjacent front image and rear image in said plurality of clear images to correspond to one displacement quantity of depth of field; and (3) extending a depth of said front image to reach said corresponding displacement quantity of depth of field and then combine said front image with said rear image in sequence, allowing said plurality of clear images to combine into a stereoscopic image corresponding to said object contour.

5. The object contour detection method according to claim 4, wherein allowing a microprocessor to detect and record said plurality of positions and said plurality of images in said step (1), allowing said microprocessor to remove respectively unclear areas from said plurality of images and allowing said microprocessor to calculate said displacement quantity between said two adjacent positions in said plurality of positions in said step (2), and allowing said microprocessor to extend a depth of said front image to reach said corresponding displacement quantity of depth of field, and combine said front image with said rear image, allowing said plurality of clear images to be combined into a stereoscopic image corresponding to said object contour in said step (3).

6. The object contour detection method according to claim 5, wherein allowing a repeated movement mechanism to drive said lens to move around repeatedly.

7. The object contour detection method according to claim 6, wherein said repeated movement mechanism is a voice coil motor.

* * * * *